United States Patent [19]

Domine et al.

[11] 3,884,786

[45] May 20, 1975

[54] HOT MELT COMPOSITIONS PRODUCED BY IRRADIATING ETHYLENE COPOLYMERS IN THE PRESENCE OF WAX

[75] Inventors: Joseph Dominic Domine, Somerville; Roy Henry Schaufelberger, Basking Ridge, both of N.J.

[73] Assignee: Union Carbide Corporation, New York, N.Y.

[22] Filed: Oct. 2, 1973

[21] Appl. No.: 402,758

Related U.S. Application Data

[62] Division of Ser. No. 273,542, July 20, 1972.

[52] U.S. Cl. 204/159.14; 260/28.5 AV; 260/28.5 R
[51] Int. Cl. ............................ B01j 1/10; B01j 1/12
[58] Field of Search ......... 260/28.5 AV; 204/159.14

[56] References Cited
UNITED STATES PATENTS

| | | | |
|---|---|---|---|
| 3,160,575 | 12/1964 | Bartl | 204/159.14 |
| 3,274,086 | 9/1966 | Potts | 204/159.14 |
| 3,436,325 | 4/1969 | Authauser | 204/159.2 |
| 3,530,084 | 9/1970 | Potts | 260/28.5 |
| 3,734,843 | 5/1973 | Tubbs | 204/159.14 |

*Primary Examiner*—Murray Tillman
*Assistant Examiner*—Richard B. Turer
*Attorney, Agent, or Firm*—Francis M. Fazio

[57] ABSTRACT

Hot melt compositions produced by preparing a concentrate of wax and copolymer, irradiating the concentrate to produce an irradiated concentrate and then diluting the irradiated concentrate with additional quantities of wax to obtain the hot melt composition. The improved three step method permits the incorporation of copolymers having higher molecular weights in the hot melt composition; it was also found that the copolymers are more readily dissolved in the wax. The copolymers used are the ethylene-vinyl acylate and ethylene-alkyl acrylate copolymers.

3 Claims, No Drawings

HOT MELT COMPOSITIONS PRODUCED BY IRRADIATING ETHYLENE COPOLYMERS IN THE PRESENCE OF WAX

This application is a divisional of Ser. No. 273,542 filed July 20, 1972.

BACKGROUND OF THE INVENTION

The addition of ethylene-vinyl acylate copolymers or ethylene-alkyl acrylate copolymers to wax to produce wax blends having improved properties is well known and has been practiced for many years, as shown by U.S. Pat. No. 2,877,196. Also known is the addition to wax of copolymers of ethylene and vinyl acetate that have been irradiated with high energy ionizing radiation, prior to the blending, as shown by U.S. Pat. No. 3,530,084, or the irradiation of a mixture of polyethylene and wax, as shown in U.S. Pat. No. 3,436,325. The presence of the polymer in the hot melt composition upgrades the performance of the wax for use in hot melt coating and adhesive compositions.

The improvement obtained by the presence of the polymers in the blend is known to increase as the molecular weight of the polymer increases, that is, as the melt index decreases. Thus, the most desirable practice would be the use of polymers or copolymers having very high molecular weights; it also being known that the copolymers are more efficacious. However, the dissolution of very high molecular weight copolymers in wax without thermal or thermomechanical degradation of the polymer or wax is difficult. The high temperatures and severe mixing conditions required with the very high molecular weight copolymers are known to result in degradation of the copolymer and the finished product does not contain the high molecular weight copolymer but instead contains a thermally degraded, lower molecular weight copolymer. The actual and relative amount of degradation which occurs increases with the initial molecular weight of the copolymer, that is, a low molecular weight copolymer would degrade less on both an absolute and proportional basis than a very high molecular weight copolymer. As molecular weight of the copolymer is increased, a point of diminishing returns is reached where increasing the molecular weight of the copolymer does not increase the molecular weight of the copolymer in the hot melt measurably due to the increased amount of degradation.

In most commercial hot melt mixing operations wherein a copolymer having a melt index of 1.5 dgm./min. or higher is dissolved in wax, the mixing operation is generally carried out at temperatures of 100°C. or higher in order that the solution be completed in a commercially acceptable period of time. For these relatively high melt index, relatively low molecular weight copolymers these conditions are satisfactory and there is no indication of significant copolymer degradation. However, the more desired hot melt compositions are those containing a relatively high molecular weight copolymer having a melt index below 1.5 dgm./min., preferably below 1 dgm./min. In order to prepare these compositions temperatures above 150°C. are usually required, often 200°C. or higher, to completely dissolve the polymers in the wax. Even at these higher temperatures, it has been necessary to carry out the hot melt mixing for much longer periods of time, and the combination of these harsher conditions has generally resulted in significant and severe copolymer degradation.

DESCRIPTION OF THE INVENTION

We have now found an improved method whereby a wax-copolymer hot melt coating and adhesive composition can be readily produced in which the copolymer in the coating and adhesive hot melt composition has a melt index below about 1.5 dgm./min. These compositions can be readily and rapidly produced without the disadvantages previously encountered.

In the process of this invention a relatively low molecular weight, relatively high melt index ethylene-vinyl acylate copolymer or ethylene-alkyl acrylate copolymer is initially compounded with wax at a low temperature, generally at a temperature from about 60°C. to 90°C. though lower or higher temperatures can be used. In most instances, but not necessarily, less than the total amount of wax desired in the final wax-copolymer hot melt composition is used; that is, a major amount of from about 50 per cent or more of the relatively low molecular weight copolymer is compounded with a minor amount of wax in this initial step. The product of this initial step is referred to in this specification as the "concentrate." This initial step can be carried out in conventional polymer processing equipment (Banbury mixer, hot melt extruder, roll mill, Brabender mill, etc.) and, though not preferred, there need not be complete solution of this copolymer in the wax. Since the copolymer used to prepare the concentrate has a relatively high melt index and is one which dissolves readily in the wax there is no problem in the production of the concentrate and there is no evidence of extensive thermal or mechanical degradation of the copolymer. The starting copolymers used in this initial step have a relatively high melt index of from about 1.5 dgm./min. to about 100 dgm./min., preferably from about 1.5 dgm./min. to about 30 dgm./min. The process however is not restricted to the use of such copolymers and copolymers having lower or higher melt indices can be used; however, the maximum advantages of this invention are observed with the use of such copolymers initially.

In the second step of the process of this invention the concentrate is exposed to radiation, the product of this second step is referred to in this specification as the "irradiated concentrate." The irradiation results in an increase in molecular weight of the copolymer as evidenced by a decrease in the melt index, without any noticeable effect on the wax present in the irradiated composition. The irradiation can be carried out on the molten composition or on the composition in solid form; any temperature from about 0°C. or lower up to the melting point of the composition, or higher, can be used provided that the temperature is not so high as to cause degradation of the wax or the copolymer. The preferred temperature is from about 20°C. to about 40°C.

The irradiation is carried out with a sufficient dose to lower the initial melt index of the copolymer in the composition. This dose will vary depending on the initial melt index of the copolymer and the final melt index desired, the temperature at which the irradiation is being conducted, the physical form of the concentrate that is being irradiated and other factors known to affect the rat of reaction. The dose will normally range from 0.01 to 5 megareps of absorbed dose.

At the completion of the irradiation the copolymer in the irradiated concentrate has a lower melt index than the initial copolymer used to prepare the concentrate had prior to irradiation. This melt index can now be as low as about 0.01 dgm./min. The particular value of the melt index of the copolymer in the irradiated concentrate is primarily a matter of choice and the reaction is controlled by the operator by known means to obtain the desired relatively low melt index. Thus, one can start with a concentrate containing an ethylene-vinyl acetate copolymer having a relatively high melt index of about 10 dgm./min. and produce an irradiated concentrate wherein the copolymer has a relatively low melt index of less than 0.2 dgm./min.; alternatively, one can irradiate the same copolymer to the extent that the copolymer in the irradiated concentrate has a relatively low melt index of 1.2 dgm./min. Or, one can start with a concentrate containing an ethylene-vinyl acetate copolymer having a relatively high melt index of about 5 dgm./min. and product an irradiated concentrate wherein the copolymer has a relatively low melt index of about 0.85 dgm./min. In every instance, however, there is a decrease in melt index and an increase in molecular weight of the copolymer. The melt index of the copolymer in the irradiated concentrate can be as low as 0.1 per cent of the value of the melt index of the initial copolymer used to prepare the concentrate that is subsequently irradiated. The preferred irradiated concentrates are those in which the copolymer has a relatively low melt index below 1.0 dgm./min. In the past is has been difficult to produce hot melt wax-copolymer compositions by the known methods containing copolymers having such low melt index values. The copolymer after irradiation is free of noticeable gel particles which would present problems in the subsequent step and ultimate use of the hot melt composition.

The source and type of radiation is not critical and any form of ionizing radiation can be used. Gamma rays, X-rays, beta radiation, protons, neutrons, and alpha particles may all be used. These are well known, as are the means for obtaining them, and do not require any further description to enable one skilled in the art to understand what is meant.

The copolymers are the known copolymers of ethylene and a vinyl acylate or an alkyl acrylate containing 5 per cent or more, usually 15 to 40 per cent by weight, of polymerized vinyl acylate or alkyl acrylate. The vinyl acylate can have from 2 to 4 carbon atoms in the acylate group; the alkyl acrylate can have from 1 to 4 carbon atoms in the alkyl group; also included in the term alkyl acrylate are the free acrylyl acids and the alkyl methacrylates. Illustrative of suitable copolymers one can mention the copolymers of ethylene with vinyl acetate, vinyl propionate, vinyl butyrate, methyl acrylate, ethyl acrylate, propyl acrylate, isopropyl acrylate, butyl acrylate, methyl methacrylate, ethyl methacrylate, isobutyl acrylate, butyl methacrylate, acrylic acid, methacrylic acid, and the like.

In the third step of the process of this invention the irradiated concentrate is dissolved in additional quantities of wax to obtain the desired concentration of copolymer in the hot melt coating and adhesive composition. This dissolution is carried out by conventional means. It has been found, however, that the time required for this dissolution in the additional wax was much shorter than the time that would be required to dissolve a copolymer having essentially the same low melt index as has the copolymer in the irradiated concentrate by the previous commercial methods. Not only was the time unexpectedly less, but the temperature at which the dissolution was carried out can be lower. The temperature of this dissolution can be from about 110°C. to about 150°C. even though the copolymer in the irradiated concentrate has a melt index below 1.5 dgm./min. This discovery is of great commercial significance since it decreases the cost and time for producing the final hot melt coating and adhesive compositions and also eliminates the problem of thermal and thermomechanical degradation of the components thereof. The process also makes possible the ready preparation of hot melt coating and adhesive compositions containing high molecular weight (low melt index) copolymers that in many instances were not heretofore commercially producable. The product of this third step is the desired hot melt coating or adhesive composition and is referred to in this specification by that designation or by the term "hot melt composition."

The hot melt compositions can also contain the other additives conventionally present, such as antioxidants, inhibitors, fillers, pigments and colorants, polymer modifiers, modifying polymers, synthetic resins and waxes, surface reactive agents all of which are known in the art.

The following examples further serve to illustrate the invention. The procedures used in evaluating the compounds were: ASTM D 1238-65T for the melt index and ASTM D 1505-63T for the density.

EXAMPLE 1

A series of three concentrates was produced by initially compounding mixtures of wax and ethylenevinyl acetate (EVA) copolymer in a Banbury mill at 70°C. for 10 minutes. The copolymer used has an initial relatively high melt index of 20 dgm./min. and a vinyl acetate content of 28 weight percent.

The three concentrates were irradiated in air at about 20°C. with high energy electrons by exposure to the radiation from a two MEV van de Graaff electron accelerator. The irradiated copolymer in the irradiated concentrates now had a low melt index calculated to be about 1.2 dgm./min. This value is estimated on the basis that the melt viscosities of these irradiated concentrates were similar to the melt viscosity of the control at the same concentration and temperature; the control was produced using a copolymer having a melt index of 1.2 dgm./min. The dose was adjusted so that a hot melt blend of 40 weight percent irradiated copolymer and 60 weight per cent wax would have about the same melt viscosity as the comparative control blend hereinafter described. When all other factors are equal, e.g., concentration, temperature, etc., melt viscosity can be used as a measure of molecular weight. The three irradiated concentrates were diluted with wax to yield hot melt coating and adhesive compositions containing 40 weight per cent copolymer. This dilution was carried out in a standard commercial-type laboratory mixer at 120°C. to 125°C.

The comparative control blend was prepared by mixing 40 parts of ethylene-vinyl acetate copolymer having an initial melt index of 1.2 dgm./min. and a vinyl acetate content of 28 weight percent with 60 parts of wax in a commercial-type laboratory mixer.

The details and results are summarized in the following table:

| Run | A | B | C | Control |
|---|---|---|---|---|
| Concentrate, pts. by wt. | | | | |
| EVA (MI=20 dgm./min.) | 80 | 85 | 90 | 0 |
| Wax | 20 | 15 | 10 | 0 |
| Irradiated concentrate | | | | |
| Dosage, megareps | 1.5 | 1.3 | 0.9 | 0 |
| Hot melt composition, pts. | | | | |
| Irradiated concentrate A | 50 | 0 | 0 | 0 |
| Irradiated concentrate B | 0 | 47.1 | 0 | 0 |
| Irradiated concentrate C | 0 | 0 | 44.4 | 0 |
| EVA(MI=1.2 dgm./min.) | — | — | — | 40 |
| Wax | 50.0 | 52.9 | 55.6 | 60 |
| Mixing time, min. | 115 | 130 | 145 | 260 |
| Viscosity at 121.1°C., cps | 42,300 | 39,900 | 41,800 | 42,800 |

The data show that the total mixing time for the preparation of Run A was only 44 per cent of the mixing time required for the preparation of the control; for the preparation of Run B only 50 per cent and for the preparation of Run C only 56 per cent. These reductions in time are of great commercial significance and were completely unexpected.

EXAMPLE 2

The concentrate from Run B of Example 1 was irradiated with a dose of 0.78 megarep to produce an irradiated concentrate D. The irradiated copolymer in this irradiated concentrate now had a melt index calculated to be about 5 dgm./min. This irradiated concentrate was used to produce a hot melt composition by mixing in a commercial-type laboratory mixer with wax at 120°C. to 125°C. A comparative control blend was also prepared by mixing an ethylene-vinyl acetate copolymer with wax in the same mixer at 120°C. to 125°C.

The copolymer used in the control had a relatively high melt index of 5 dgm./min. and a vinyl acetate content of 28 weight per cent. It was found that the mixing time required to produce a hot melt composition by the process of this invention was significantly less than the mixing time required to produce the control.

The details and results are summarized below:

| Run | D | Control |
|---|---|---|
| Hot melt composition | | |
| Irradiated concentrate D, pts. | 47.1 | 0 |
| EVA (MI=5 dgm./min.),pts. | — | 40 |
| Wax, pts. | 52.9 | 60 |
| Mixing time, min. | 85 | 125 |
| Viscosity at 121.1°C., cps. | 16,700 | 17,600 |

EXAMPLE 3

A series of concentrates was prepared each concentrate containing a major amount of an ethylenevinyl acetate copolymer having a vinyl acetate content of 28 weight per cent and a melt index of 6.6 dgm./min., and a minor amount of wax. The concentrates were produced by compounding at about 70°C. The concentrates, and the starting copolymer itself, were irradiated in a two MEV van de Graaff electron accelerator and a maximum dose required to obtain a gel-free irradiated product was determined. It was found that the concentrates could be given a larger dose than the control and still yield a gel free product. It was also determined that weight average molecular weight of the copolymer in the irradiated concentrates was higher than in the irradiated control. The following table shows the compositions of the mixtures, the dose imparted before gel particles were observed, and the weight average molecular weight of the copolymer after irradiation; also determined was the melt index of the irradiated composition. The presence of gels was determined by dissolving the sample in hot toluene, casting a film on a glass plate, evaporating the toluene, and examining the plate visually for evidence of insoluble gels. At dosage levels higher than those set forth, one would detect gels.

| Irradiated concentrate | A | B | C | D | Control |
|---|---|---|---|---|---|
| EVA | 90 | 85 | 80 | 70 | 100 |
| Wax | 10 | 15 | 20 | 30 | 0 |
| Dose, megareps | 1.35 | 1.80 | 1.95 | 2.15 | 1.12 |
| Melt index, dgm/min. | 0.169 | 0.185 | 0.59 | 4.6 | 0.059 |
| Mol.wt. × $10^{-3}$= | 576 | | 535 | 477 | 352 |

* = weight average molecular weight

The irradiated samples described above were used to produce hot melt adhesive compositions containing 20 per cent and 40 per cent copolymer contents by two procedures.

Procedure I

The irradiated sample and wax were hot melt blended at about 120°C. in a laboratory mixer. It was found that the time required for complete solution was less for the irradiated concentrates than the time required for the irradiated control. The saving in mixing time was as high as 48.7 per cent as shown by the data reported by the designation "Mixing time reduction, %." The low temperature brittleness properties, $T_{50}$, of the hot melt blends containing 40 per cent copolymer were determined and it was found that the hot melt blends produced using the irradiated concentrates were tougher than the hot melt blend produced from the irradiated control.

Procedure II

The irradiated sample and wax were dissolved in hot benzene at about 80°C. The solution was then vacuum dried to remove the solvent. This procedure avoids thermomechanical degradation of the copolymer and hence the blends have higher melt viscosities than the corresponding blends produced by Procedure A.

In all instances, the melt viscosities of the blends produced using the irradiated concentrates were higher than the melt viscosities of the corresponding irradiated control.

The data and results are set forth in the following table.

was 195 minutes, which is a 44.5 per cent longer period of time than that required to dissolve the irradiated concentrate above. The melt viscosity of the control hot melt belend was 22,000 centipoises.

The hot melt compositions of the examples, which were produced in accord with the process of this invention, were equal or superior, in general, in heat seal performance and ageing properties than were their respective comparative control compositions.

| Irradiated concentrate | Procedure I | | | | | | | | | | Procedure II | | | | | | | | | |
|---|---|---|---|---|---|---|---|---|---|---|---|---|---|---|---|---|---|---|---|---|
| | A | | B | | C | | D | | Cont. | | A | | B | | C | | D | | Cont. | |
| EVA in final blend, percent | 20 | 40 | 20 | 40 | 20 | 40 | 20 | 40 | 20 | 40 | 20 | 40 | 20 | 40 | 20 | 40 | 20 | 40 | 20 | 40 |
| Mixing time, min | 245 | 320 | 210 | 285 | 195 | 240 | 210 | 195 | 260 | 380 | | | | | | | | | | |
| Mixing time reduction, percent | | 5.8 | | 15.6 | 19.2 | 25 | 25 | 36.8 | 19.2 | 48.7 | | | | | | | | | | |
| Melt viscosity ×10⁻³* | 2.86 | 198 | 3.16 | 189 | | 198 | 2.63 | 212 | 2.50 | 148 | 3.07 | 271 | 3.64 | 307 | 3.56 | 318 | 3.58 | 303 | 2.82 | 267 |
| $T_{50}$ °C | | −29 | | −32 | | −33 | | −35 | | −28 | | | | | | | | | | |

*At 121.1° C. of the solvent free EVA-wax composition.

EXAMPLE 4

A concentrate was produced by hot compounding 10 parts of wax with 90 parts of an ethylene ethyl acrylate copolymer having an ethyl acrylate content of 18 weight per cent and a melt index of 20 dgm./min. The concentrate was exposed to the ionizing radiation from a two MEV van de Graaff electron accelerator to impart a total dose of 2.05 megareps. A portion of this irradiated concentrate was hot melt blended in an additional quantity of wax at about 120°C. in a laboratory mixer to produce a hot melt composition containing 40 weight per cent of the copolymer. The time required for this latter dissolution step was 135 minutes. The hot blend composition had a melt viscosity at 121.1°C. of 18,400 centipoises. The melt index of the copolymer in the irradiated concentrate after irradiation was about 6 dgm./min.

For comparative purposes 60 parts of wax and 40 parts of an ethylene acrylate copolymer having an ethyl acrylate content of 18 weight per cent and a melt index of 6 dgm./min. were hot melt blended in the same manner. The time required to obtain complete dissolution

We claim:

1. An irradiated concentrate of wax and an ethylene-vinyl acylate copolymer or an ethylene-alkyl acrylate copolymer containing a major amount of said copolymer, wherein the vinyl acylate or the alkyl acrylate content is from 5 to 40 weight percent, said copolymer having an initial melt index of from about 1.5 dgm./min. to about 100 dgm./min., said irradiated concentrate obtained by the steps of (a) producing a concentrate of said wax and said copolymer and (b) irradiating said concentrate with high energy ionizing radiation of an absorbed dose of from 0.01 to 5 megareps to increase the molecular weight of said copolymer and thereby produce said irradiated concentrate.

2. An irradiated concentrate as claimed in claim 1, wherein the vinyl acylate is vinyl acetate and wherein said copolymer in said irradiated concentrate has a melt index below about 1 dgm./min.

3. An irradiated concentrate as claimed in claim 1, wherein the alkyl acrylate is ethyl acrylate and wherein said copolymer in said irradiated concentrate has a melt index below about 1 dgm./min.

* * * * *